United States Patent

Nomura et al.

[11] Patent Number: 5,635,126
[45] Date of Patent: Jun. 3, 1997

[54] METHOD FOR MOLDING PINION

[75] Inventors: Hiroshi Nomura; Norio Sato, both of Tokyo, Japan

[73] Assignee: Asahi Kogaku Kogyo Kabushiki Kaisha, Tokyo, Japan

[21] Appl. No.: 573,136

[22] Filed: Dec. 7, 1995

Related U.S. Application Data

[63] Continuation of Ser. No. 149,778, Nov. 10, 1993, abandoned.

[30] Foreign Application Priority Data

Nov. 12, 1992 [JP] Japan ................. 4-301948

[51] Int. Cl.⁶ .................................... B29C 45/44
[52] U.S. Cl. ................ 264/334; 249/63; 425/577; 425/DIG. 58
[58] Field of Search ............... 264/328.1, 318, 264/334; 249/63, 64; 425/577, DIG. 58, 468

[56] References Cited

U.S. PATENT DOCUMENTS

| | | |
|---|---|---|
| 3,357,653 | 12/1967 | Otsuka . |
| 3,779,688 | 12/1973 | Jullien-Davin .............. 425/DIG. 58 |
| 3,840,636 | 10/1974 | Deguchi et al. ................. 264/318 |
| 3,895,389 | 7/1975 | Arai . |
| 3,973,268 | 8/1976 | Arai . |
| 4,114,169 | 9/1978 | Yamamori . |
| 4,134,657 | 1/1979 | Nomura . |
| 4,847,647 | 7/1989 | Ueda . |
| 4,954,859 | 9/1990 | Kitazawa . |
| 5,386,740 | 2/1995 | Nomura et al. . |

OTHER PUBLICATIONS

Rosato, Dominick V., *Injection Molding Handbook*, 1986, pp. 197–200.

*Primary Examiner*—Jill L. Heitbrink
*Attorney, Agent, or Firm*—Greenblum & Bernstein P.L.C.

[57] ABSTRACT

A molded pinion includes separate gear portions with gear teeth, and gearless shaft portions provided between the adjacent gear portions. The shaft portions have an outer diameter smaller than the dedendum of the gear teeth of the gear portions. Each shaft portion has an axial length longer than an axial length of each gear portion. Disclosures are also directed to a molding die assembly including first split dies which are movable in radial directions to form the gear portions of the pinion, and second split dies which are movable in radial directions independently of the first split dies to form the shaft portions, and a molding method using the molding die assembly.

14 Claims, 3 Drawing Sheets

METHOD FOR MOLDING PINION

This application is a continuation of application Ser. No. 08/149,778, filed Nov. 10, 1993, now abandoned.

FIELD OF THE INVENTION

The present invention relates to a molded pinion, and particularly a molded pinion having a long axial length. The present invention also relates to a molding die assembly and a method for molding a pinion.

DESCRIPTION OF RELATED ART

There are known resin mold pinions. However, it is difficult to mold a high precision pinion having a long axial length. Gear portions of an elongated pinion are molded by a molding die assembly consisting of upper and lower (or right and left) dies which are split in the radial direction. However, the radial projections that define the gear portions make it impossible to move the split dies in diametrically opposing directions (i.e., radial directions) upon completion of the molding of the gear portions. Consequently, it is necessary to axially displace the molded pinion to disengage the same from the molding dies to thereby permit the latter to move in the radial directions. The displacement of the molded pinion in the axial direction cannot be easily effected particularly when the pinion has a long axial length, and a high precision product cannot be produced.

SUMMARY OF THE INVENTION

The primary object of the present invention is to provide a long molded pinion which can be easily and precisely molded.

Another object of the present invention is to provide a molding die assembly which can easily and precisely produce a molded pinion. The present invention is also aimed at provision of a molding method using such a molding die assembly.

According to the present invention, an elongated molded pinion has discontinuous gear portions which are spaced at a predetermined distance (i.e., pitch) along the longitudinal axis thereof, so that there are discontinuous shaft portions (i.e, relief portions) having no gear between the gear portions. The discontinuous gear portions and the discontinuous shaft portions are alternately arranged and satisfy the following requirements.

There are at least two gear portions and at least one shaft portion therebetween. The diameter of the shaft portion(s) is smaller than the dedendum of the gear teeth of the gear portions. Furthermore, the axial length (width) of the shaft portion(s) is larger than the axial length (width) of the gear portions. The shaft portion(s) is not necessarily circular in cross section. The second requirement that the diameter of the shaft portion(s) is smaller than the dedendum of the gear teeth of the gear portions means that the outer periphery of the shaft portion(s) is accommodated within the profile defined by the dedendum of the gear teeth.

According to an aspect of the present invention, there is provided a molded pinion comprising at least two separate gear portions with gear teeth, and at least one shaft portion on which no gear tooth is provided and which is provided between adjacent gear portions, wherein at least one shaft portion has an outer diameter smaller than the dedendum of the gear teeth of the gear portions, and at least one shaft portion has an axial length longer than an axial length of each gear portion.

The molded pinion can be precisely and easily produced by a molding die assembly comprising a shaft rod which is adapted to form a center axial hole of the pinion, first split dies which are movable in radial directions with respect to the shaft rod to form the gear portions of the pinion, and second split dies which are movable in radial directions with respect to the shaft rod independently of the first split dies to form the at least one shaft portion of the pinion.

The first split dies include die elements corresponding to the gear teeth of the gear portions and said second split dies include die elements corresponding to the at least one shaft portion. Each of the die elements of the first split dies has an axial length (width) shorter than an axial length (width) of each of the die elements of the second split dies.

The first split dies define a predetermined shape of a first molding cavity which surrounds the shaft rod and which prevents separation of the first split dies when the gear portions of the pinion are molded within the first molding cavity. The second split dies define a predetermined shape of a second molding cavity which surrounds the shaft rod and which permits the second split dies to separate from one another when the shaft portion of the pinion is molded within the second molding cavity.

With this molding die assembly, after the pinion is molded in the molding cavity defined by the closed die assembly, the second split dies are moved away from the shaft rod to open the second split dies. Thereafter, the molded pinion is slightly moved in the axial direction by a predetermined displacement. Consequently, the gear portions of the molded pinion are disengaged from the first split dies and come in a space corresponding to the molding cavity defined by the second split dies which has been enlarged by the movement of the second split dies. Hence, the slight movement of the molded pinion in the axial direction makes it possible to separate the gear portions of the molded pinion from the first split dies for molding the gear portions.

According to another aspect of the present invention, there is provided a molding method for producing a molded pinion as constructed above, comprising introducing a molding material in a predetermined shape of a molding cavity defined in a die assembly including movable first split dies for molding the gear portions, movable second split dies for molding at least one shaft portion, and a shaft rod, moving the second split dies away from the shaft rod to open the second split dies upon formation of the molded pinion within the molding cavity, moving thereafter the molded pinion in the axial direction by a predetermined displacement, and moving the first split dies away from the shaft rod to open the first split dies.

The molded pinion is removed or ejected from the molding cavity by a pusher (i.e., protruding sleeve) after the first split dies are moved away from the shaft rod.

In theory, it is possible to axially move an elongated pinion having continuous gear portions which extend over the entire length of the pinion by a displacement long enough to remove the same from a molding cavity which is defined by upper and lower dies to mold the whole gear portion. However, the axial displacement of the molded pinion increases as the axial length of the pinion to be molded increases. In case of an elongated pinion having a long axial length, it is necessary to provide a space large enough to accommodate the displacement of the molded pinion, which is however, impractical. Contrary to this, according to the present invention, it is necessary to move the molded pinion by a slight movement in the axial direction in order to remove the same from the molding cavity, regardless of the axial length of the pinion. Consequently, molded pinions can be easily and precisely mass-produced.

BRIEF DESCRIPTION OF THE DRAWINGS

The invention will be described below in detail with reference to the accompanying drawings, in which.

DESCRIPTION OF THE PREFERRED EMBODIMENT

Figure 1:
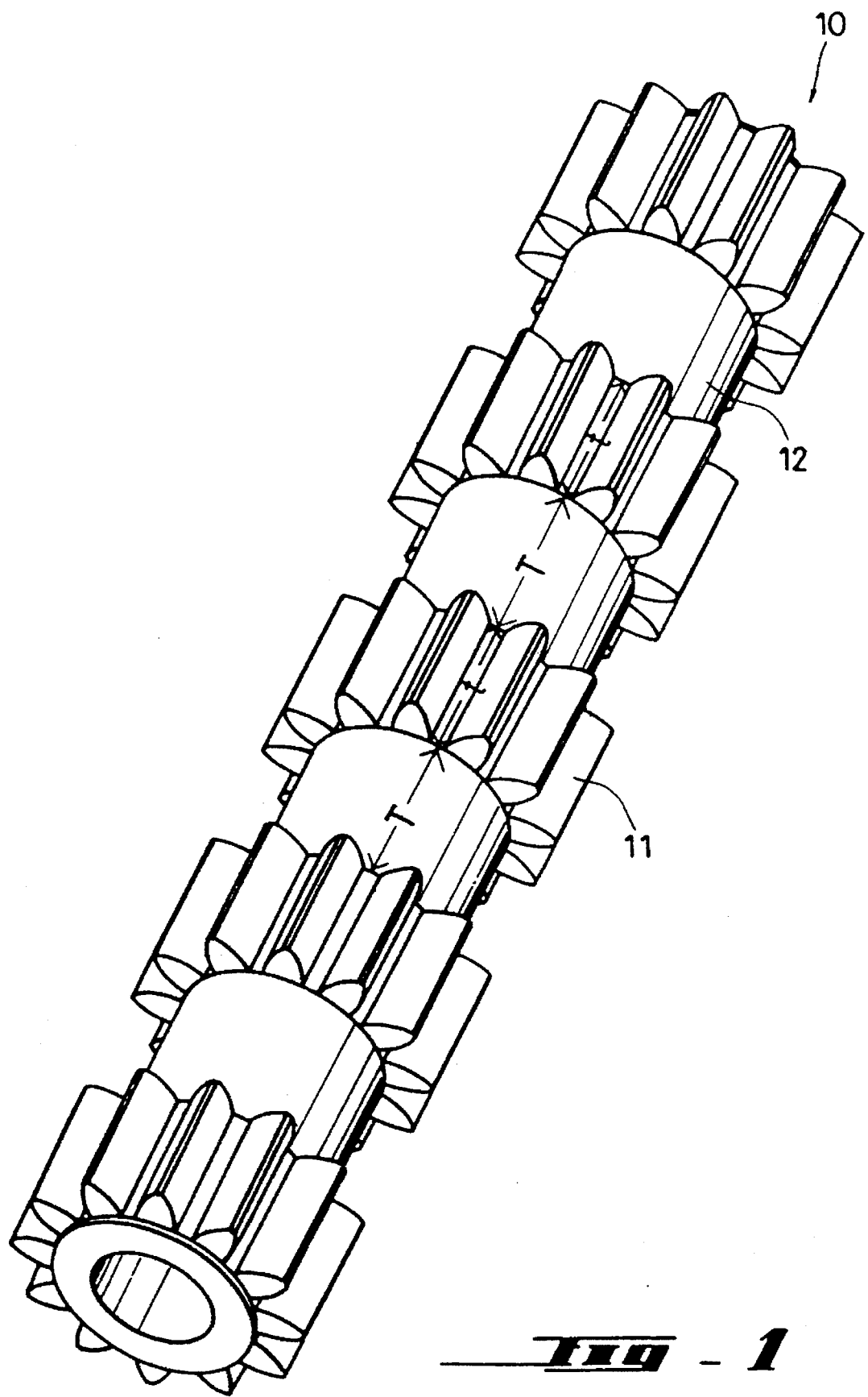
FIG. 1 is a perspective view of a molded pinion according to the present invention.

FIG. 1 shows a molded pinion 10 according to the present invention by way of example. The molded pinion 10 is comprised of discontinuous gear portions 11 and discontinuous shaft (or relief) portions 12. The gear portions 11 and the shaft portions 12 are alternately arranged along the axis of the pinion. The outer diameter d (FIGS. 5 and 6) of the shaft portions 12 is smaller than the dedendum or root circle D of the gear portions 11 (i.e, d<D). The axial length (width) t of each gear portion 11 is smaller than the axial length (width) T of each shaft portion 12 (i.e, t<T). Namely, the gear portions 11 are spaced at a pitch (or distance) corresponding to the axial length T of the shaft portions 12 in the axial direction, and the shaft portions 12 are spaced at a pitch (or distance) corresponding to the axial length t of the gear portions 11 in the axial direction, respectively. According to the basic concept of the present invention, the molded pinion 10 is provided with at least two gear portions 11 and at least one shaft (relief) portion 12 between the gear portions 11. The present invention can be applied to a longer pinion having more than two gear portions 11 and more than one shaft (relief) portion, as shown in FIG. 1, in which the molded pinion 10 has five alternate gear portions 11 and four alternate shaft portions 12, by way of example.

Figure 2:
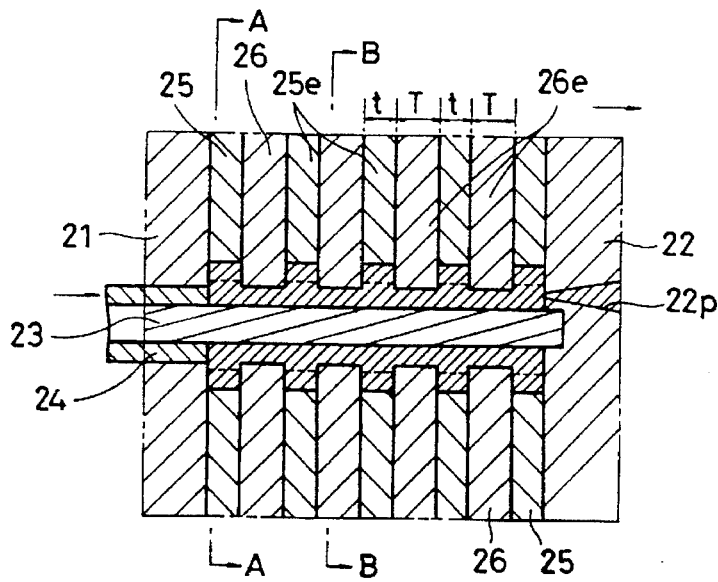
FIGS. 2, 3 and 4 are sectional views of a molding die assembly shown in different positions to illustrate a molding process, according to the present invention.
Figure 3:
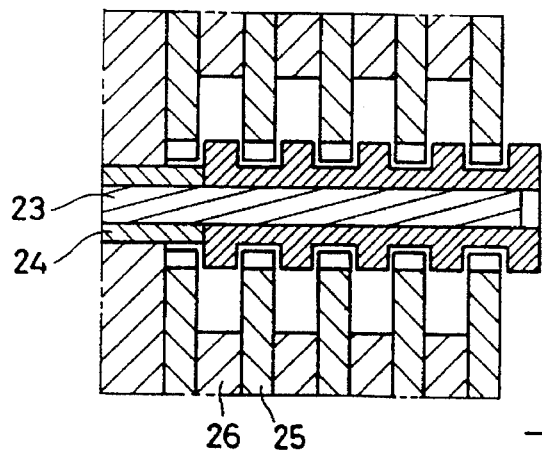
Figure 4:
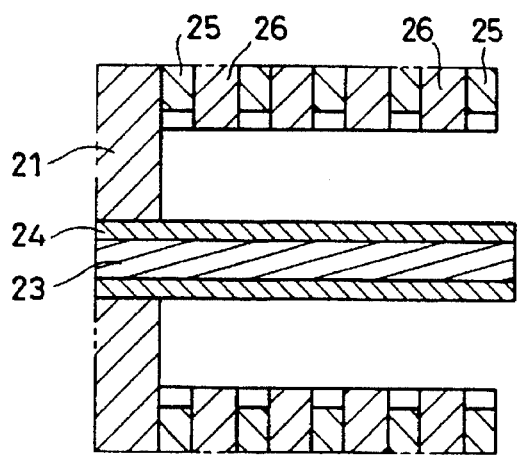
Figure 4:
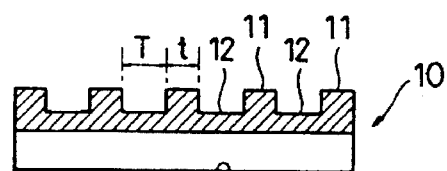

FIGS. 2, 3 and 4 show different molding steps to produce a molded pinion 10 having the five gear portions 11 and the four shaft portions 12 between the adjacent gear portions 11, as shown in FIG. 1, using a molding die assembly.

The molding die assembly includes a pair of split dies (first dies) 25 to mold the gear portions 11 and a pair of split dies (second dies) 26 to mold the shaft portions 12. The first and second dies 25 and 26 are movably supported between a stationary end plate 21 and a movable end plate 22. An axial rod 23 extends between the stationary end plate 21 and the movable end plate 22 at the center portions thereof. The rod 23 extends through the stationary end plate 21 and is secured thereto. A pusher 24 (i.e., extruding sleeve) extends through the stationary end plate 21 and is movably attached to the outer periphery of the rod 23 to slide thereon. The first dies 25 and the second dies 26 are independently movable towards and away from each other and, accordingly, the rod 23.

Figure 5:
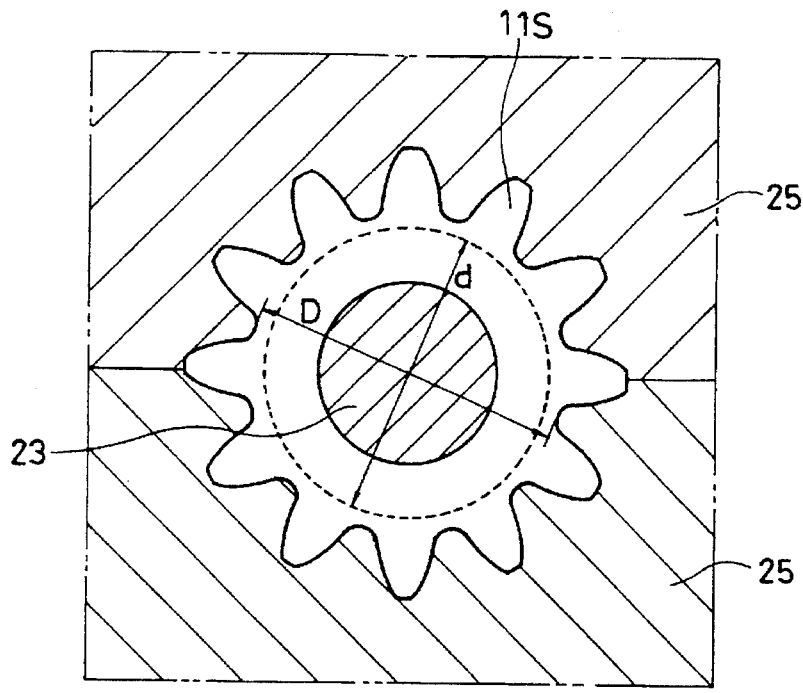
FIG. 5 is a sectional view along the line A—A in FIG. 2.
Figure 6:
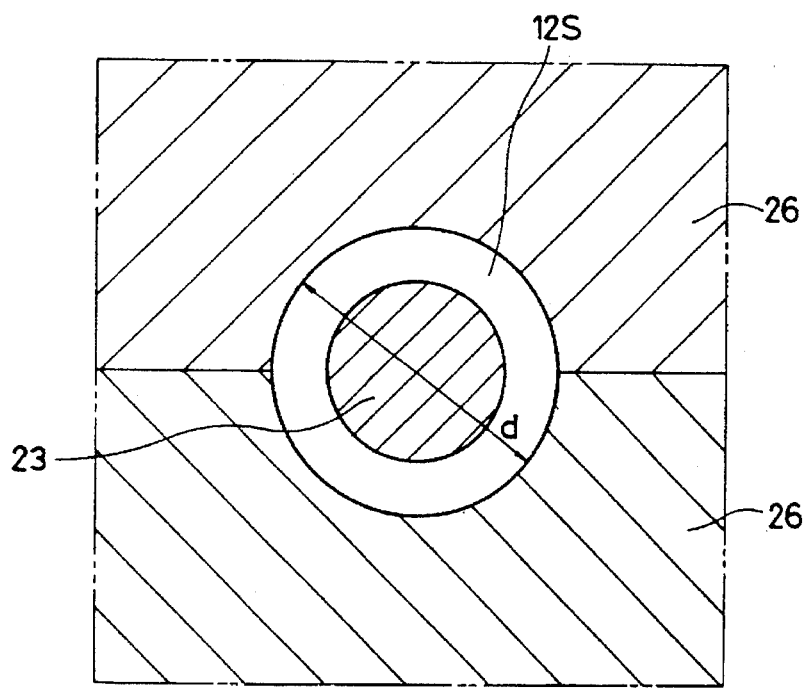
FIG. 6 is a sectional view along the line B—B in FIG. 2.

The first dies 25, for the gear portions 11, define a molding cavity 11s between the first dies and the rod 23 at the closest position thereof, as shown in FIG. 5. The second dies 26, for the shaft portions 11, define a molding cavity 12s between the second dies and the rod 23, at the closest position thereof, as shown in FIG. 6. The outer diameter d of the molding cavity 12s defined by the second molding dies 26, corresponding to the outer diameter of the shaft portions 12 is smaller than the dedendum D of the molding cavity 12s defined by the gear portions 11, corresponding to the dedendum of the gear teeth of the gear portions 11. The pair of first dies 25 include die elements 25e, the number of which corresponds to the number of the gear portions 11, and the pair of second dies 26 include die elements 26e, the number of which corresponds to the number of the shaft portions 12. The first die elements 25e and the second die elements 26e are alternately arranged. The thickness t of each first die element 25e is smaller than the thickness T of each second die element 26e.

To mold the pinion 10, the first and second dies 25 and 26 are moved to the closest position in which the first and second dies 25 and 26 are closest to the center rod (i.e., shaft rod) 23, and the movable end plate 22 is moved close to the stationary end plate 21, as shown in FIG. 2. In this position, a synthetic resin monomer is introduced and set into the molding cavities 11s and 12s through a port 22p formed in the movable end plate 22.

After the synthetic resin monomer is set, the upper and lower second dies 26 are opened, i.e., moved away from one another, and the movable end plate 22 is moved away from the center rod 23, as shown in FIG. 3. Since the shaft portions 12 are circular in cross section, the separation of the upper and lower second dies 26 can be easily carried out. Note that the same would be true for the shaft portions 12 whose cross section is other than a circular shape and is, for example, a rectangular shape or other polygonal shapes.

Thereafter, the molded pinion 10 is slightly moved in the axial direction by the pusher (i.e., extruding sleeve) 24 on and along the center rod 23 by a displacement larger than the width t of a first die element 25e but smaller than the width T of a second die element 26e. As a result, the gear portions 11 of the molded pinion 10 are moved or disengaged from the first molding dies 25 into the space corresponding to the molding cavity 12s which has been enlarged by the movement or separation of the second dies 26, as shown in FIG. 3. In this position, the first molding dies 25 are no longer engaged with the gear teeth (i.e., projections) of the gear portions 11 of the molded pinion 10. Accordingly, the upper and lower first molding dies 25 can be easily opened or separated.

Thereafter, as can be seen in FIG. 4, the upper and lower first molding dies 25 are opened or separated. The molded pinion 10 is then disengaged from the center rod 23 by the pusher (i.e., extruding sleeve) 24, so that the molded pinion 10 is ejected or removed from the molding die assembly.

The shaft rod 23 defines the center axial hole 13 of the molded pinion 10 as shown in FIG. 4.

Thus, the molded pinions 10, as shown in FIG. 1, can be easily and precisely mass-produced by the molding die assembly, as constructed above.

We claim:

1. A method for producing a molded pinion having at least two separate gear portions with gear teeth, at least one gearless shaft portion provided between the gear portions and molded integrally therewith, and a center axial hole extending through the gear portions and the at least one gearless shaft portion, wherein the at least one gearless shaft portion has an outer diameter smaller than a dedendum of the gear teeth and wherein the at least one gearless shaft portion has an axial length longer than an axial length of each gear portion, said method comprising:

introducing a molding material in a molding cavity of predetermined shape defined in a die assembly including movable first split dies for molding the gear portions, movable second split dies for molding the gearless shaft portions, a stationary end plate and a movable end plate which the first and second movable split dies are supported between the stationary and movable end plates a shaft rod extending through a center of the molding cavity between the first and second movable split dies for forming the center axial hole, the shaft rod further extending through and secured to the stationary end plate, the first and second split dies being movable in a radial direction of the shaft rod, and a pusher extending through the stationary end plate and movably attached to an outer periphery of the shaft rod to be slidable thereon;

moving the second split dies away from the shaft rod to expose the gearless shaft portions upon formation of the molded pinion;

sliding the pusher along the shaft rod to move the molded pinion in an axial direction by a predetermined displacement to expose the gear portions; and, moving the first split dies away from the shaft rod.

2. The molding method of claim 1, further comprising removing the molded pinion from the molding cavity after movement of the first split dies away from the shaft rod.

3. The molding method of claim 1, further comprising:

displacing the molded pinion in an axial direction by a distance larger than an axial length of the gear portions, but smaller than an axial length of the gearless shaft portions, wherein the first split dies include elements defining an axial length corresponding to the gear teeth of the gear portions and the second split dies include die elements defining an axial length corresponding to the gearless shaft portions.

4. The molding method of claim 1, wherein the shaft rod is fixed in said axial direction with respect to the first and second split dies, while sliding the pusher with respect to the shaft rod to move the molded pinion in said axial direction away from the shaft rod.

5. The molding method of claim 2, wherein removing the molded pinion further comprises:

sliding the pusher further along the shaft rod for a distance sufficient to push the molded pinion off the shaft rod.

6. A method for molding a pinion having at least two separate gear portions with gear teeth and at least one gearless shaft portion provided between the gear portions, comprising:

providing a die assembly including movable first split dies for molding the gear portions, movable second split dies for molding the gearless shaft portions, a stationary end plate and a movable end plate which the first and second movable split dies are supported between the stationary and movable end plates, a shaft rod extending through a center of the molding cavity between the first and second movable split dies and fixed in an axial direction with respect to the first and second split dies, the shaft rod extending through and secured to the stationary end plate, and a pusher extending through the stationary end plate and movably attached to an outer periphery of the shaft rod to be slidable thereon, wherein the die assembly defines a molding cavity of predetermined shape;

introducing a molding material into the molding cavity and allowing the molding material to set;

moving the second split dies away from the shaft rod to expose the gearless shaft portions;

sliding the pusher along the shaft rod to move the molded pinion in said axial direction away from the shaft rod by a predetermined displacement to expose the gear portions; and, moving the first split dies away from the shaft rod.

7. The molding method of claim 6, wherein providing a die assembly to define a molding cavity of predetermined shape further comprises:

moving the movable first split dies together and moving the movable second split dies together so that the cavity forms the gearless shaft portions to have an outer diameter which is smaller than a dedendum of the gear teeth portion of the cavity formed by the movable first split dies.

8. The molding method of claim 6, further comprising:

removing the molded pinion from the molding cavity after movement of the first split dies away from the shaft rod.

9. The molding method of claim 6, wherein said sliding the pusher further comprises:

displacing the molded pinion in an axial direction by a distance larger than an axial length of the gear portions, but smaller than an axial length of the gearless shaft portions, wherein the first split dies include elements defining an axial length corresponding to the gear teeth of the gear portions and the second split dies include die elements defining an axial length corresponding to the gearless shaft portions.

10. The molding method of claim 8, wherein removing the molded pinion from the molding cavity comprises:

sliding the pusher further along the shaft rod for a distance sufficient to push the molded pinion off the shaft rod.

11. The molding method of claim 6, wherein each of the at least one gearless shaft portions has an axial length longer than an axial length of each of the gear portions.

12. The molding method of claim 6, wherein the shaft rod forms a center axial hole through the gear portions and the at least one gearless shaft portion, and wherein the molding cavity integrally molds the at least one gearless shaft portion with the gear portions.

13. A method for producing a molded pinion having at least two separate gear portions with gear teeth and at least one gearless shaft portion provided between the gear portions, comprising:

providing a die assembly including movable first split dies for molding the gear portions, movable second split dies for molding the gearless shaft portions, a stationary end plate, a movable end plate, and a core fixedly supported on the stationary end plate, wherein the core extends through a center of a molding cavity defined by the first and second split dies, the stationary end plate and the movable end plate, and the core is further provided with a pusher slidably attached to an outer periphery of the core;

introducing a molding material into the molding cavity and allowing the molding material to set;

moving the second split dies away from the core to expose the gearless shaft portions upon formation of the molded pinion;

sliding the pusher along the core to move the molded pinion in an axial direction by a predetermined displacement to expose the gear portions; and, moving the first split dies away from the core.

14. The method for producing a molded pinion according to claim 13, further comprising:

moving the movable end plate away from the core after moving the split dies away from the core and before sliding the pusher along the core.

* * * * *

UNITED STATES PATENT AND TRADEMARK OFFICE
CERTIFICATE OF CORRECTION

PATENT NO. : 5,635,126
DATED : June 3, 1997
INVENTOR(S) : H. NOMURA et al.

It is certified that error appears in the above-indentified patent and that said Letters Patent is hereby corrected as shown below:

At column 5, line 6 (claim 1, line 18), change "plates" to ---plates,---.

At column 5, line 4, change "plate which" to ---plate on which---.

Signed and Sealed this

Seventeenth Day of March, 1998

Attest:

BRUCE LEHMAN

Attesting Officer

Commissioner of Patents and Trademarks